United States Patent
Shibaike (10) Patent No.: US 8,468,463 B2
(45) Date of Patent: Jun. 18, 2013

(54) IMAGE PROCESSING APPARATUS, IMAGE PROCESSING METHOD AND COMPUTER READABLE MEDIUM

(75) Inventor: Rei Shibaike, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 945 days.

(21) Appl. No.: 11/984,389

(22) Filed: Nov. 16, 2007

(65) Prior Publication Data

US 2008/0229256 A1  Sep. 18, 2008

(30) Foreign Application Priority Data

Mar. 12, 2007  (JP) ................................. 2007-061558

(51) Int. Cl.
   *G06F 3/048* (2006.01)

(52) U.S. Cl.
   USPC ............ 715/790; 715/797; 345/173; 345/642

(58) Field of Classification Search
   USPC .................................. 715/790; 345/173, 642
   See application file for complete search history.

(56) References Cited

U.S. PATENT DOCUMENTS

| | | | | |
|---|---|---|---|---|
| 5,265,202 A | * | 11/1993 | Krueger et al. | 715/797 |
| 5,283,560 A | * | 2/1994 | Bartlett | 715/729 |
| 5,602,570 A | * | 2/1997 | Capps et al. | 345/173 |
| 5,617,114 A | * | 4/1997 | Bier et al. | 345/634 |
| 5,757,358 A | * | 5/1998 | Osga | 715/862 |
| 5,764,229 A | * | 6/1998 | Bennett | 715/797 |
| 5,838,317 A | * | 11/1998 | Bolnick et al. | 715/764 |
| 5,848,399 A | * | 12/1998 | Burke | 705/27.2 |
| 5,892,511 A | * | 4/1999 | Gelsinger et al. | 715/794 |
| 6,031,530 A | * | 2/2000 | Trueblood | 715/791 |
| 6,075,531 A | * | 6/2000 | DeStefano | 715/788 |
| 6,160,556 A | * | 12/2000 | Kinoe et al. | 345/419 |
| 6,243,094 B1 | * | 6/2001 | Sklar | 715/853 |
| 7,358,962 B2 | * | 4/2008 | Dehlin et al. | 345/173 |
| 7,600,191 B2 | * | 10/2009 | Yoshikawa et al. | 715/790 |
| 2002/0080180 A1 | * | 6/2002 | Mander et al. | 345/769 |
| 2003/0007017 A1 | * | 1/2003 | Laffey et al. | 345/862 |
| 2004/0261038 A1 | * | 12/2004 | Ording et al. | 715/792 |
| 2005/0004917 A1 | * | 1/2005 | Ueda et al. | 707/100 |
| 2005/0174327 A1 | * | 8/2005 | Lee | 345/158 |
| 2005/0223334 A1 | * | 10/2005 | Guido et al. | 715/794 |

FOREIGN PATENT DOCUMENTS

JP  A-4-279980  10/1992
JP  A 9-223241   8/1997

OTHER PUBLICATIONS

English Translation of Aug. 30, 2011 Office Action issued in Japanese Patent Application No. 2007061558.

* cited by examiner

*Primary Examiner* — Phenuel Salomon
(74) *Attorney, Agent, or Firm* — Oliff & Berridge, PLC (57) ABSTRACT

The image processing apparatus is provided with: a display that displays an object; a receiving device that receives a specified position specified by a user on the display; a holding device that holds setting of a process for the object; a judgment device that judges whether or not the specified position received by the receiving device is included in the display areas of a plural objects overlappedly; and an execution device that executes the process for selecting the plural objects of which the display areas include the specified position received by the receiving device according to the setting held in the holding device, when the judgment device judges that the specified position received by the receiving device is included in the display areas of the plural objects overlappedly.

20 Claims, 10 Drawing Sheets

IMAGE PROCESSING APPARATUS, IMAGE PROCESSING METHOD AND COMPUTER READABLE MEDIUM

CROSS REFERENCE TO RELATED APPLICATIONS

This application is based on and claims priority under 35 USC §119 from Japanese Patent Application No. 2007-61558 filed Mar. 12, 2007.

BACKGROUND

1. Technical Field

The present invention relates to an image processing apparatus on which an object is displayed, an image processing method and a computer readable medium storing a program causing a computer to execute a process for image processing.

2. Related Art

In such a work environment where objects, such as a file, a document image, an image, annotation and the like, are displayed and where these objects are selected freely on a screen, operations for selecting and moving plural objects are often performed. The operation for selecting objects on the screen is considered to be necessary, for example, in the case of moving the objects for classification, overlapping objects purposefully for making the objects a group, and moving the grouped objects as a unit or ungrouping the grouped objects.

In general, in the case in which the operations for selecting and moving objects on a screen are performed, objects are selected on the screen by being clicked or enclosed, and then moved. In the case of selecting plural objects at the same time, there are some methods in which plural objects are clicked under the condition of selecting plural objects while pushing a shift key, or plural objects are enclosed for selecting the whole objects included in the enclosed area.

In addition, on a screen that employs a touch screen, the operation for selecting objects is performed, for example, by using fingers. In such a case, in general, the objects are selected by being touched or enclosed.

Further, there is a different situation in which the plural objects overlapped each other is moved on a screen. In the case in which the whole objects overlapped each other are selected, the operation for selecting the objects is performed by enclosing whole objects in general However, when an unnecessary object is overlapped on the screen, the operation for selecting only necessary objects is not performed appropriately. In this case, for example, there are some methods in which the area including necessary objects is enclosed after separating the unnecessary object from other overlapped objects, the necessary objects are selected individually, or necessary objects are grouped.

SUMMARY

According to an aspect of the invention, there is provided an image processing apparatus comprising: a display that displays an object; a receiving device that receives a specified position specified by a user on the display; a holding device that holds setting of a process for the object; a judgment device that judges whether or not the specified position received by the receiving device is included in the display areas of a plural objects overlappedly; and an execution device that executes the process for selecting the plural objects of which the display areas include the specified position received by the receiving device according to the setting held in the holding device, when the judgment device judges that the specified position received by the receiving device is included in the display areas of the plural objects overlappedly.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described with reference to the drawings.

<A Configuration of a Table Type Display Apparatus>

Figure 1:
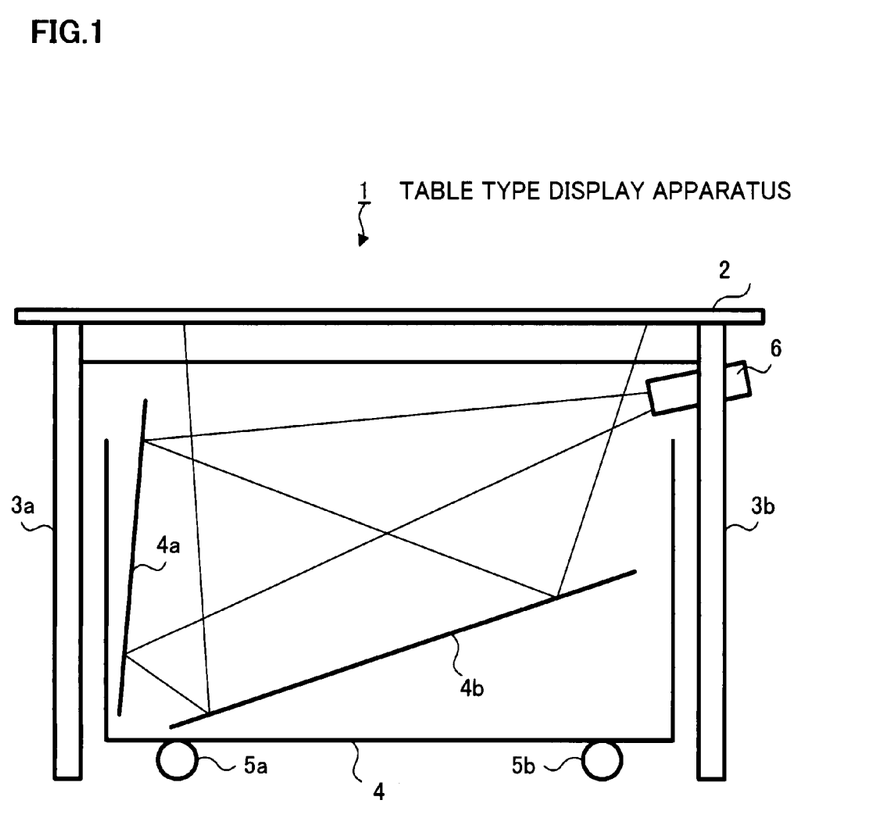
FIG. 1 is a cross sectional view of a table type display apparatus as an example of an image processing apparatus.

FIG. 1 is a cross sectional view of a table type display apparatus 1 of the present exemplary embodiment as an example of an image processing apparatus of the present invention.

The table type display apparatus 1 includes a tabletop 2 and leg portions 3a to 3d. The tabletop 2 serves as a working table for discussion or the like by some people. The leg portions 3a to 3d support the tabletop 2. The table type display apparatus 1 further includes a projection unit 4, casters 5a to 5d and a projector 6. The projection unit 4 projects an image from a back surface to the tabletop 2. The casters 5a to 5d support and freely move the projection unit 4. The projector 6 projects images so as to display the images on the tabletop 2. Here, the leg portions 3c and 3d and casters 5c and 5d are not shown in FIG. 1 because FIG. 1 is a cross sectional view.

The tabletop 2 is, for example, an oval shape so that users stand at arbitrary positions around the table type display apparatus 1 and join the discussion or the like. Further, the tabletop 2 is, for example, made from a substrate like a glass plate to which a opaque white semi-transparent filter is adhered, and has a function as a display screen 102 (see FIG. 2 for reference) displaying the image which the projection unit 4 projects. That is, in the present exemplary embodiment, the tabletop 2 has a function as an example of a display of the present invention. Furthermore, the tabletop 2 has a surface on which a touch panel 103 is mounted. That is, the tabletop 2 also has a function as the touch panel 103 (see FIG. 2 for reference) which is an example of a receiving device of the present invention to detect a touch on the displayed image by a user.

In the present exemplary embodiment, the four leg portions 3a to 3d are shown as an example. However, the number of leg portions is not limited thereto.

The projection unit 4 is formed by a box of a quadrangular prism. The top of the box facing the tabletop 2 is open. Further, there are mirrors 4a and 4b inside of the box. Here, the mirror 4a and 4b are fixed inside of the box as the projection unit 4 at mounting angles shown in FIG. 1.

The casters 5a to 5d are attached on the outer surface of the base of the projection unit 4 so as to move the projection unit 4 in response to movement of the table configured as the tabletop 2, the leg portions 3a to 3d and the projector 6. Moreover, a relative position of the projection unit 4 to the table should not be displaced. (The detail description is omitted in the figure.)

In the present exemplary embodiment, although the casters 5a to 5d are four in this case, the number of casters is not limited thereto.

The projector 6 is suspended from the back surface of the tabletop 2 and fixed under the tabletop 2. Further, the projector 6 projects an image in the direction of the mirror 4a. The image is reflected by the mirror 4b, and then projected to the tabletop 2.

In the present exemplary embodiment, the table type display apparatus 1 is shown as an example. Further, any shape of a display apparatus other than the table shape is also applied.

<A Functional Configuration of the Table Type Display Apparatus>

Next, a description will be given to a functional configuration of the table type display apparatus 1, which has a configuration described above.

Figure 2:
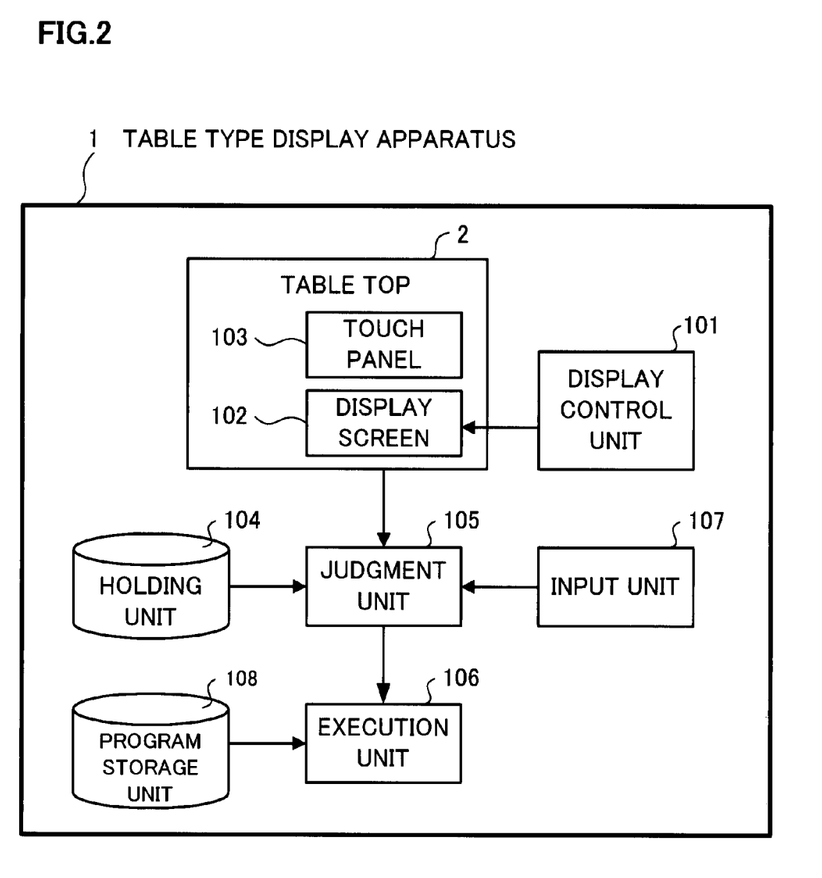
FIG. 2 is a block diagram illustrating an example of a functional configuration of the table type display apparatus.

FIG. 2 is a block diagram illustrating an example of a functional configuration of the table type display apparatus 1.

The table type display apparatus 1 includes a display control unit 101 and the display screen 102. The display control unit 101 is an example of a display control device, and controls a display of objects such as a file, a document image, an image, an annotation and the like. The display screen 102 is an example of a display of the present invention, and displays an object according to the instructions from the display control unit 101. Further, the table type display apparatus 1 includes the touch panel 103 and a holding unit 104. The touch panel 103 is an example of a receiving device of the present invention. The touch panel 103 detects the touched position when the display screen 102 is touched by a user. Then, the touch panel 103 outputs the coordinates of the touched position. The holding unit 104 of the present exemplary embodiment is an example of a holding device of the present invention. The holding unit 104 holds the setting of the process for selecting one or more objects of which the display area includes the coordinates of the touched position in advance.

Furthermore, the table type display apparatus 1 includes a judgment unit 105 and an execution unit 106. The judgment unit 105 is an example of a judgment device of the present invention. The judgment unit 105 judges whether or not the coordinates of the touched position is included in an overlapped display area of the plural objects. The execution unit 106 is an example of an execution device of the present invention. The execution unit 106 performs the process for selecting one or more objects from the plural objects of which the display area includes the coordinates of the touched position according to the setting held in the holding unit 104 when the judgment unit 105 judges that the coordinates of the touched position is included in an overlapped display area of the plural objects.

Furthermore, the table type display apparatus 1 includes an input unit 107 and a program storage unit 108. The input unit 107 is a keyboard or the like for inputting an object, inputting and setting an attribute of the selected object, or inputting a setting condition. The program storage unit 108 stores a program for selecting one or more objects described later.

The display control unit 101 outputs information on the image of the inputted object so as to control the display of the object on the display screen 102.

The display screen 102 obtains the information on the image outputted from the display control unit 101, and displays thereon.

The touch panel 103 is used by mounted on the display screen 102, and has a function as an example of the receiving device of the present invention. When a user touches the display screen 102, the touch panel 103 detects the touched position, and outputs the coordinates of the touched position. Here, the touch panel 103 may be realized by a transparent screen which covers the display screen 102 with sensors disposed for detecting a touch to the surface of the tabletop 2, or by infrared light run vertically and horizontally on the surface of the tabletop 2 in order to detect a position where the infrared light is interrupted.

The holding unit 104 is configured as, for example, EEPROM (Electronically Erasable and Programmable Read Only Memory), flash memory or the like. The holding unit 104 holds the setting of the process for selecting one or more objects of which the display area includes the coordinates of the position touched by a user.

The judgment unit 105 is realized by, for example, a CPU (Central Processing Unit) or the like for executing a program for the judgment process described later (for example, the step 104 shown in FIG. 4 and the like). In the first exemplary embodiment, the judgment unit 105 judges whether or not the coordinates of the touched position is included in an overlapped display area of the plural objects.

The execution unit 106 is realized by a CPU or the like for executing a process, for example, for moving, copying or deleting an object after selecting the object as described later when the judgment unit 105 judges that the coordinates of the touched position is included in an overlapped display area of the plural objects. The execution unit 106 performs the process for selecting one or more objects from the plural objects of which the display area includes the coordinates of the touched position according to the setting held in the holding unit 104.

The input unit 107 is, for example, a keyboard or the like for inputting the setting condition. The program storage unit 108 is, for example, a hard disk drive for storing the program for selecting one or more objects described later.

In the present exemplary embodiment, the table type display apparatus 1 is configured so as to include the holding unit 104. However, when a server (not shown in the figure) is prepared to be accessible from the table type display apparatus 1, it may be configured that the table type display apparatus 1 does not include the holding unit 104 but that the server includes the holding unit 104.

Figure 3:
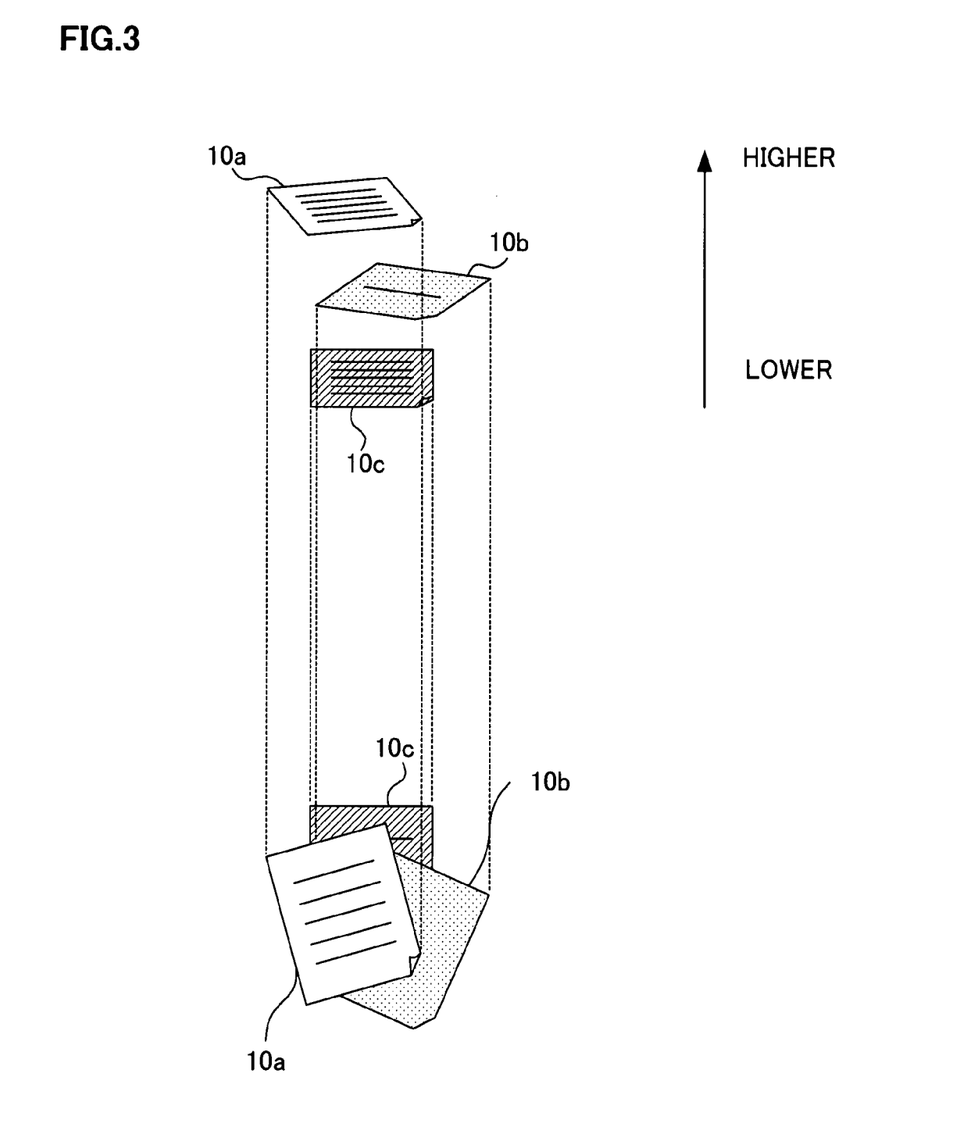
FIG. 3 is a diagram illustrating relations among overlapped objects displayed on the display screen.

FIG. 3 is a diagram illustrating relations among overlapped objects displayed on the display screen 102 used for a description below.

There are three objects 10a, 10b and 10c. The object 10c is inputted firstly, and the object 10b is inputted secondly. Then, the object 10a is inputted finally. Further, while these objects are arranged in sequence, they are overlapped each other. That is, the object 10c is located on the bottom layer, and the objects 10b and 10a are overlapped with the object 10c in sequence. The information on the sequence of the three objects 10a, 10b and 10c overlapped each other are stored in the display storing device (not shown in figures) in advance.

First Exemplary Embodiment

When a user touches the overlapped area included in the three objects 10a, 10b and 10c displayed on the display screen 102, it may be considered that the table type display apparatus 1 performs any one of three processes for selecting one or more objects from the three objects 10a, 10b and 10c according to the touch, as described below. The holding unit 104 (see FIG. 2 for reference) holds any one of the processes.

Figure 5A:
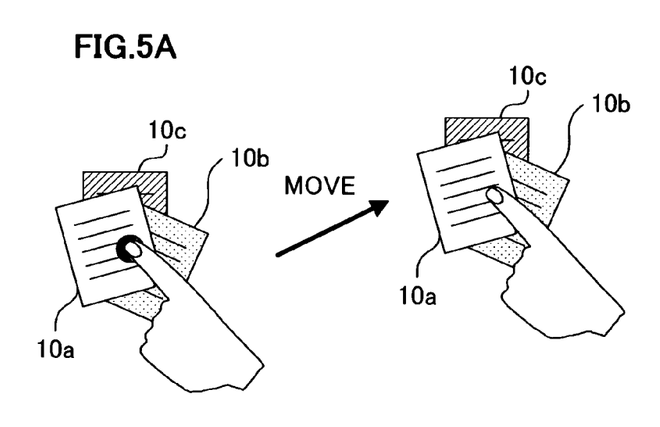
FIGS. 5A, 5B, 5C and 5D are diagrams illustrating results of performing the method for selecting one or more objects shown in FIG. 4.

(1) Select all of the three objects 10a, 10b and 10c which are overlapped and displayed at the coordinates of the position specified by the touch (see FIG. 5A and FIG. 5B as described later).

(2) Select the object 10a which is located on the top layer at the coordinates of the position specified by the touch. The selection is also performed by using conventional techniques. For example, the selection is also performed by clicking a left button (the left click button) on a mouse device (see FIG. 5C as described later).

(3) Select the objects 10b and 10c other than the object 10a which is located on the top layer at the coordinates of the position specified by the touch. For example, all of the objects 10b and 10c except the object 10a located on the top layer are selected (see FIG. 5D as described later), the object 10b located on the upper layer except the layer which the object 10a is located on is selected, the object 10c located on the bottom layer is selected or the like.

Hereinafter, a description will be given to the case in which the setting is selected based on the setting condition (1) described above and the information on the setting condition (1) is held in the holding unit 104.

(Description of the Process for Selection)

Next, a description will be given to the process for selecting one or more objects (pointing one or more objects) which is performed in the table type display apparatus 1, with reference to FIG. 4.

Figure 4:
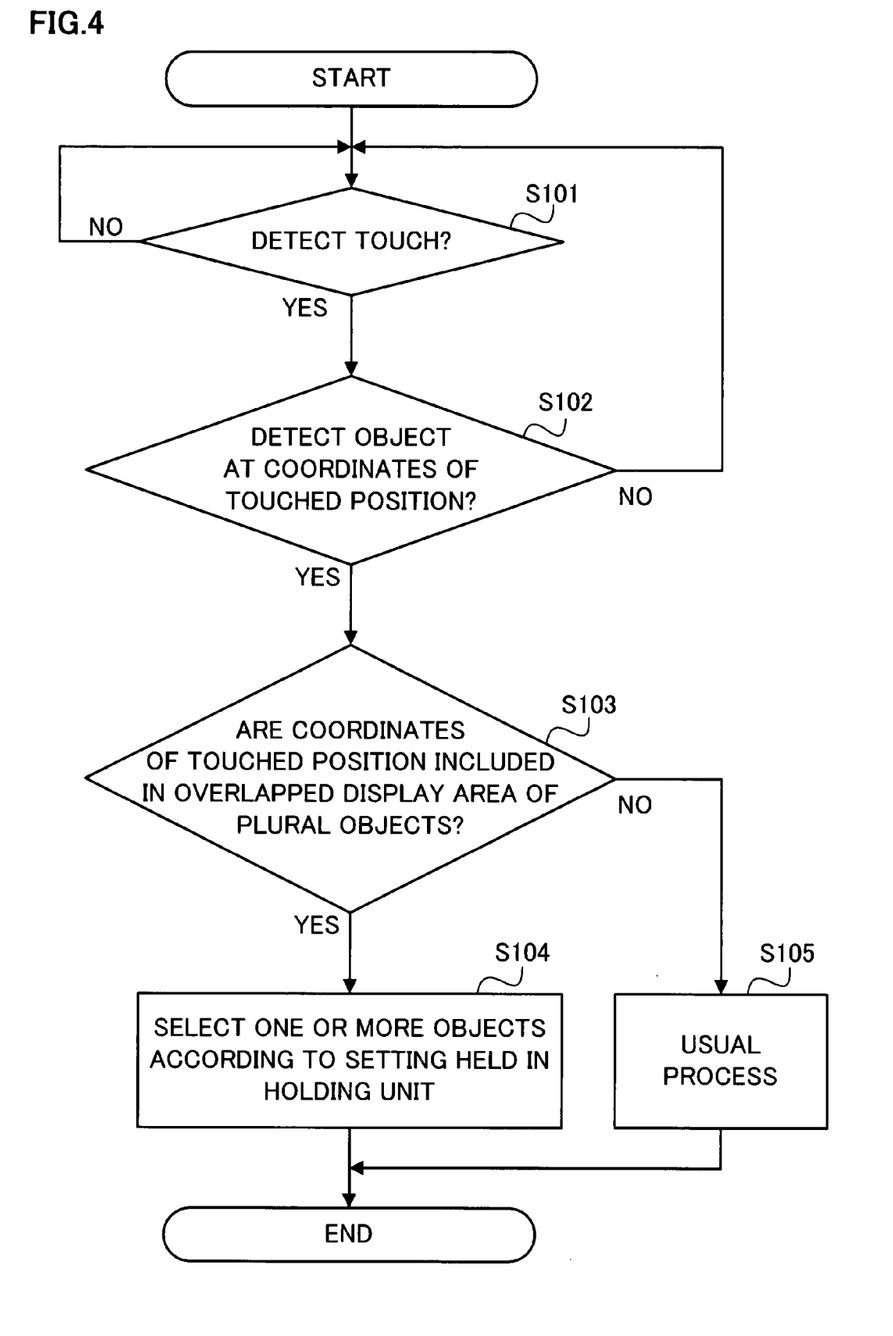
FIG. 4 is a flowchart illustrating an entire process of the program for selecting objects in the first exemplary embodiment.

FIG. 4 is a flowchart illustrating an entire process of the program for selecting objects in the first exemplary embodiment.

In the first exemplary embodiment, the case in which the objects at the coordinates of the touched position are selected when a user touches the objects displayed on the display screen 102 of the table type display apparatus 1 is described.

The table type display apparatus 1 monitors detection of a touch by a user continuously while the table type display apparatus 1 waits the touch by a user (step 101: N).

When a user touches the overlapped area included in the three objects 10a, 10b and 10c displayed on the display screen 102, the table type display apparatus 1 detects the touch (step 101: Y). Further, the judgment unit 105 cooperates with the touch panel 103 for analyzing the coordinates of the touched position and detecting the object at the coordinates of the touched position (step 102).

When there is no object at the analyzed coordinates of the touched position (step 102: N), the table type display apparatus 1 waits next touch by a user (step 101).

In contrast, when the judgment unit 105 detects the object at the analyzed coordinates of the touched position (step 102: Y), the judgment unit 105 judges whether or not the coordinates of the touched position is included in the overlapped display area of the plural objects (step 103).

When the judgment unit 105 judges that the coordinates of the touched position is included in the overlapped display area of the plural objects (step 103: Y), one or more objects are selected according to the setting of the process for selecting one or more objects held in the holding unit 104 (step 104). As described above, in the first exemplary embodiment, when the coordinates of the touched position is included in the overlapped display area of the plural objects, all of the plural objects at the coordinates of the touched position is selected based on the setting (the setting condition (1)). Therefore, all of the objects 10a, 10b and 10c are selected.

In contrast, when the judgment unit 105 judges that the coordinates of the touched position is not included in the overlapped display area of the plural objects (step 103: N), the usual process is performed (step 105).

As described above, the process for selecting one or more objects is performed in the first exemplary embodiment. In the first exemplary embodiment, the selected object is moved by a user after selected (for example, see FIG. 5A for reference).

FIGS. 5A, 5B, 5C and 5D are diagrams illustrating results of performing the method for selecting one or more objects shown in FIG. 4.

In the first exemplary embodiment, the setting condition (1) is selected. Therefore, all of the three objects 10a, 10b and 10c at the coordinates of the touched position are selected as shown in FIG. 5A. That is, all of the three objects 10a, 10b and 10c which are overlapped each other at the coordinates of the touched position are moved by a user.

Figure 5B:
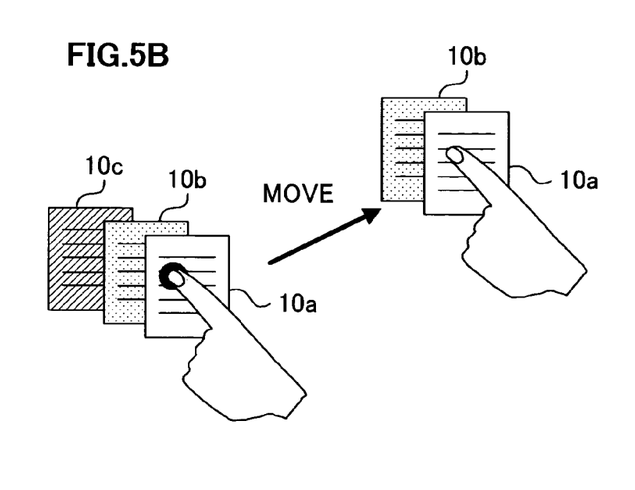

Further, as shown in FIG. 5B, when the objects 10a and 10b are overlapped each other at the coordinates of the touched position on the display screen 102 on which the three objects 10a, 10b and 10c are displayed, the overlapped two objects 10a and 10b are selected while the object 10c being not overlapped with other objects 10a and 10b at the coordinates of the touched position is not selected.

Figure 5C:
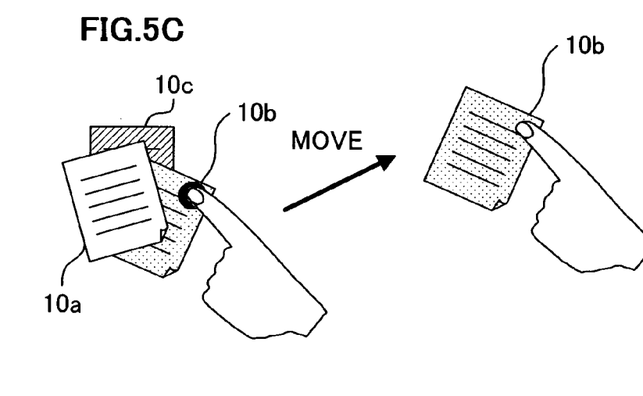

Furthermore, as shown in FIG. 5C, when the objects 10a, 10b and 10c are not overlapped each other at the coordinates of the touched position, only the touched object 10b is selected.

In the case of selecting the setting condition (3) in advance, all of the objects (the objects 10b and 10c) except the object 10a located on the top layer are selected (see FIG. 5D for reference), the object 10b located on the upper layer except the layer which the object 10a is located on is selected, or the object 10c located on the bottom layer is selected.

Figure 5D:
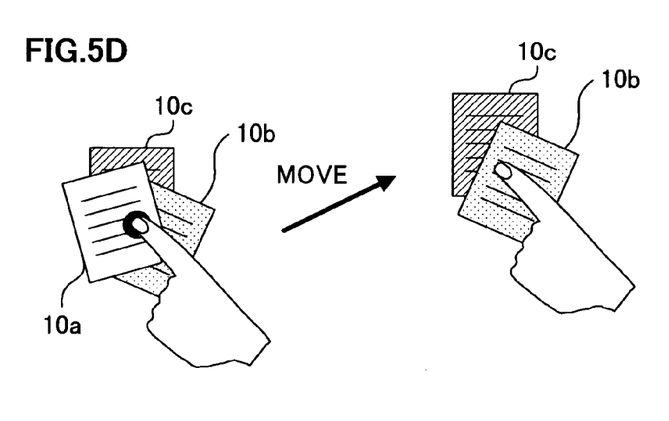

For example, when a user touches the same position many times, the object 10b located on the upper layer except the layer which the object 10a is located on may be selected at the first touch, the object 10c located on the layer just under the layer which the object 10b is located on may be selected at the second touch, and all of the objects (the objects 10b and 10c) except the object 10a located on the top layer may be selected at the third touch if the object 10c is located on the bottom layer.

In the first exemplary embodiment, a case in which the selected object is moved after performing the process for selecting the object is described. However, the present invention is not limited to the case. For example, a case in which the selected object is copied, deleted or the like may be also applied to the present invention.

In addition, in the first exemplary embodiment, a case in which the touch panel 103 is applied to the present invention is described. However, the present invention is not limited to the case. For example, a case in which one or more objects displayed on the display screen 102 are selected by a mouse device may be also applied to the present invention. That is, general pointing devices may be also applied to the present invention.

Second Exemplary Embodiment

In the first exemplary embodiment, the process for selecting one or more objects is described in the case of touching the overlapped area included in the objects. On the other hand, in the second exemplary embodiment, the process for selecting objects will be described in the case of selecting the object specified by a touch and other object overlapped with the specified object when the object specified by the touch is overlapped with other object at the coordinates of the touched position or at the other area other than the coordinates of the touched position.

(Setting of the Process for Selecting Objects)

When the display area of the object specified by a touch exemplifying a selected object of the present invention is overlapped with the display area of other object exemplifying the different object of the present invention, for example, the setting condition described below is considered as the processes for selecting the touched object and the other object of which the display area is overlapped with the display area of the touched object.

(1) Select the object specified by a touch and the other object which is located on a layer under the layer which the specified object is located on (see FIG. 7 described later).

(2) Select the object specified by a touch and the other object which is located on a layer above the layer which the selected object is located on (see FIG. 8 described later).

(3) Select the object specified by a touch and the other object overlapped with the specified object (see FIG. 9 described later).

(Description of the Process for Selection)

Figure 6:
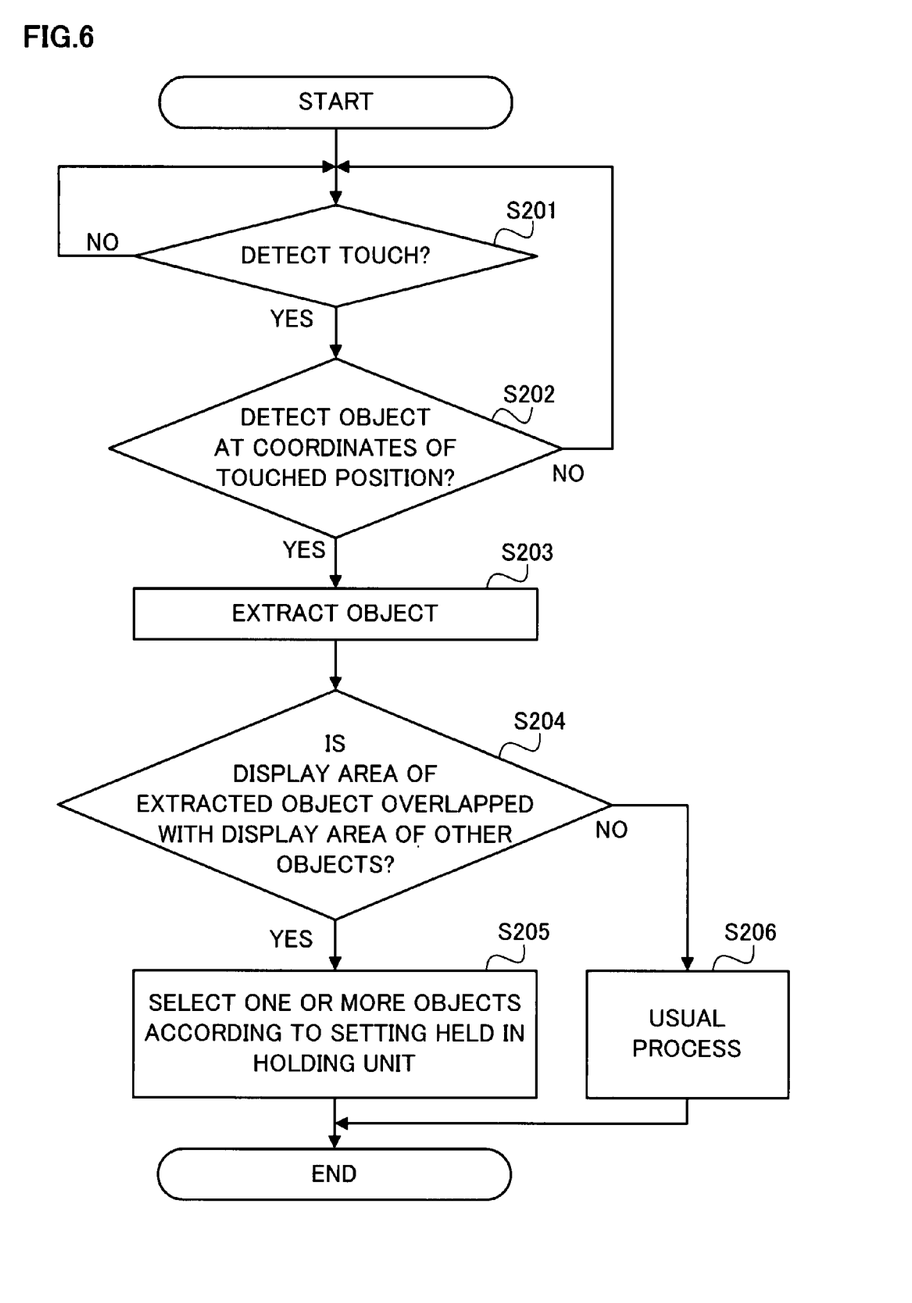
FIG. 6 is a flowchart illustrating an entire process of the program for selecting one or more objects in the second exemplary embodiment.

FIG. 6 is a flowchart illustrating an entire process of the program for selecting one or more objects in the second exemplary embodiment.

The table type display apparatus 1 monitors detection of a touch by a user continuously while the table type display apparatus 1 waits the touch by a user (step 201: N).

When a user touches one of the three objects 10a, 10b and 10c displayed on the display screen 102, the table type display apparatus 1 detects the touch (step 201: Y). Further, the judgment unit 105 cooperates with the touch panel 103 for analyzing the coordinates of the touched position and detecting the object at the coordinates of the touched position (step 202).

When there is no object at the analyzed coordinates of the touched position (step 202: N), the table type display apparatus 1 waits a next touch by a user (step 201).

In contrast, when the judgment unit 105 detects the object at the analyzed coordinates of the touched position (step 202: Y), the judgment unit 105 extracts the object (step 203).

Further, the judgment unit 105 judges whether or not the display area of the extracted object is overlapped with the display area of other object (step 204).

When the judgment unit 105 judges that the display area of the extracted object is overlapped with the display area of the other object (step 204: Y), one or more objects are selected according to the setting of the process for selecting one or more objects held in the holding unit 104 (step 205). For example, in the case of setting the setting condition (1) in advance, the object specified by the touch and the objects of which the display area is overlapped with the display area of the specified object, located on layers under the layer which the specified object is located on are selected.

In contrast, when the judgment unit 105 judges that the display area of the extracted object is not overlapped with the display area of the other object (step 204: N), the usual process is performed (step 206).

As described above, the process for selecting one or more objects is performed in the second exemplary embodiment.

FIGS. 7A, 7B, 8A, 8B, 9A and 9B are diagrams illustrating results of performing the method for selecting objects shown in FIG. 6.

Figure 7A:
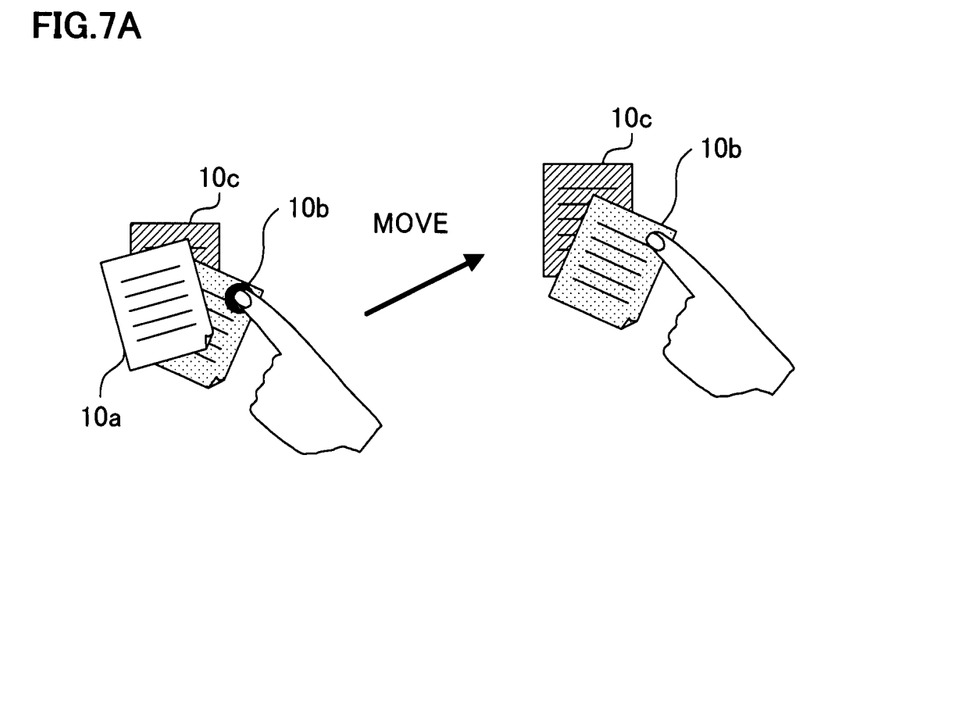
FIG. 7A is a diagram illustrating a result of performing the method for selecting objects shown in FIG. 6.
Figure 7B:
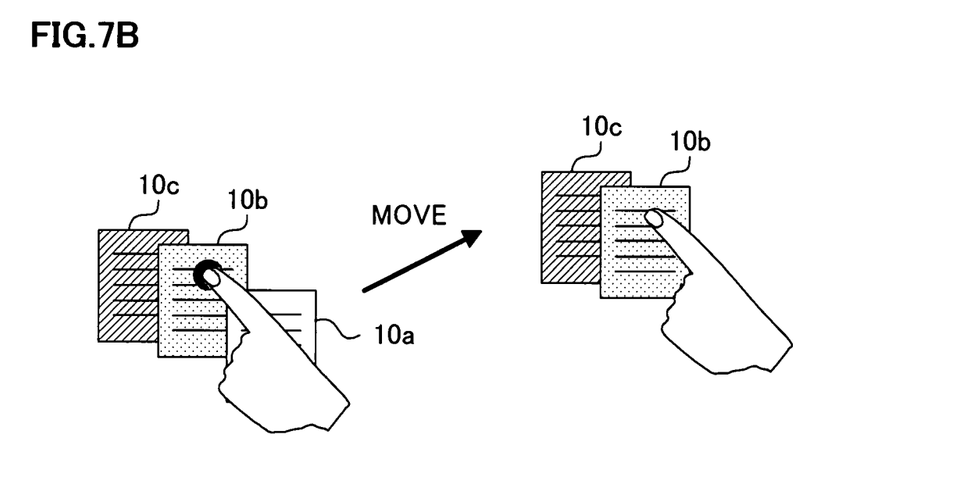
FIG. 7B is a diagram illustrating another result of performing the method for selecting objects shown in FIG. 6.

FIGS. 7A and 7B show the case in which the setting condition (1) for selecting the object specified by a touch and the other object located on a layer under the layer which the selected object is located on is set.

As shown in FIGS. 7A and 7B, the objects 10a and 10c are overlapped with the object 10b. When the object 10b is specified by a touch, the object 10c located on the layer under the layer which the object 10b is located on is also selected in addition to the object 10b according to the setting condition (1).

Figure 8A:
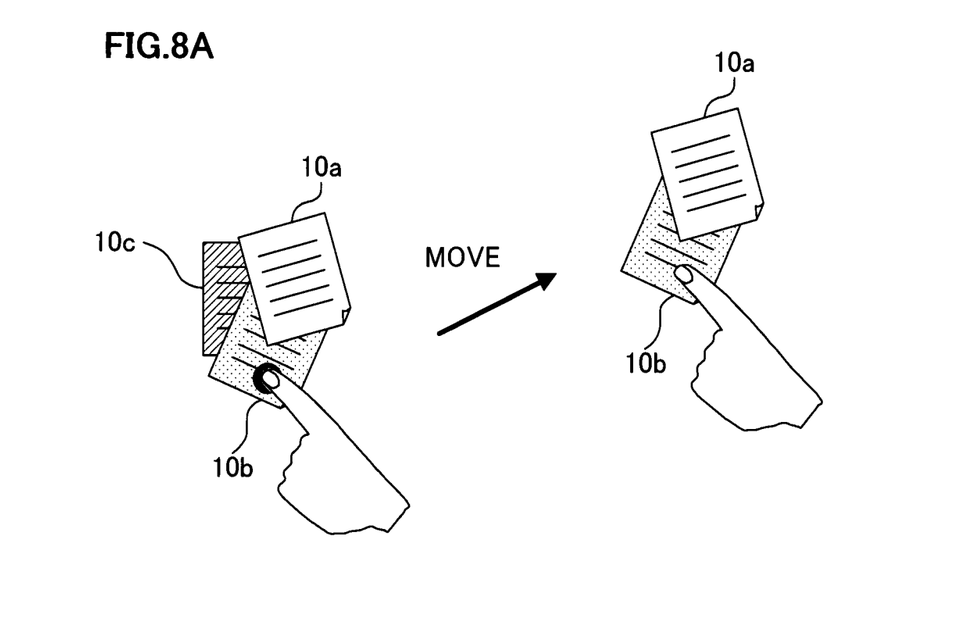
FIG. 8A is a diagram illustrating further result of performing the method for selecting objects shown in FIG. 6.
Figure 8B:
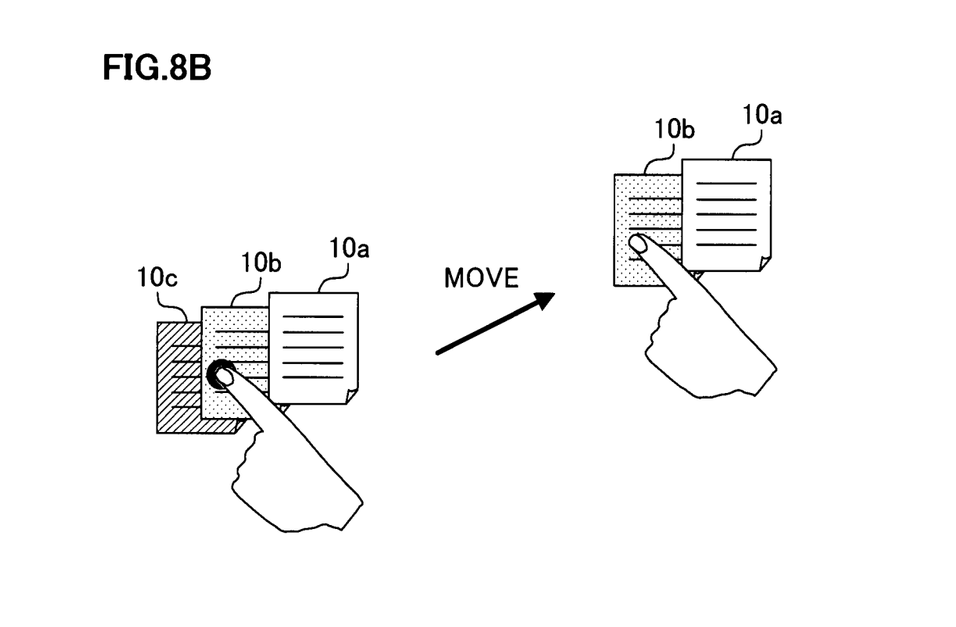
FIG. 8B is a diagram illustrating furthermore result of performing the method for selecting objects shown in FIG. 6.

FIGS. 8A and 8B show the case in which the setting condition (2) for selecting the object specified by a touch and the other object located on the layer above the layer which the specified object is located on is set. In this case, the object 10a located on the layer above the layer which the object 10b is located on is also selected in addition to the object 10b (see FIGS. 8A and 8B for references).

Figure 9A:
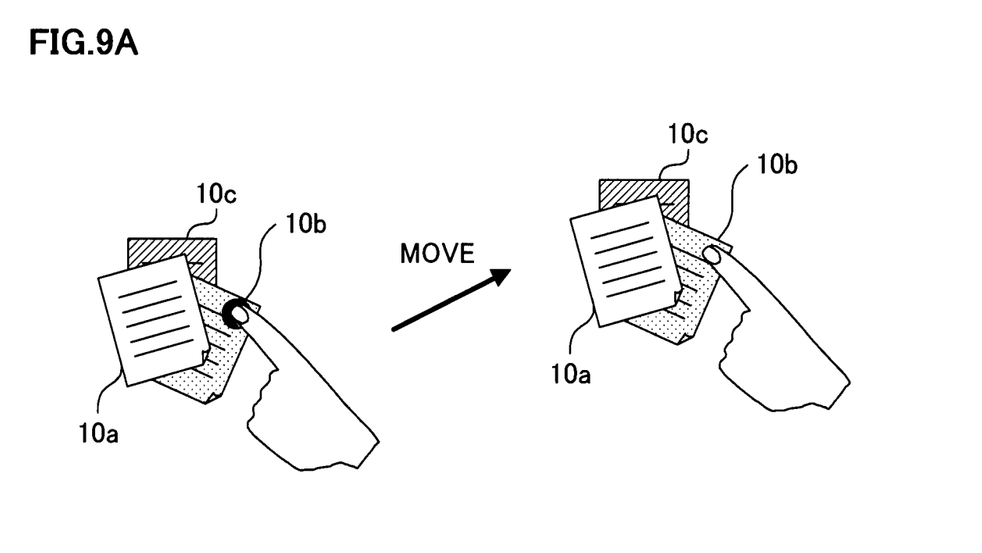
FIGS. 9A and 9B are diagrams illustrating furthermore result of performing the method for selecting objects shown in FIG. 6.
Figure 9B:
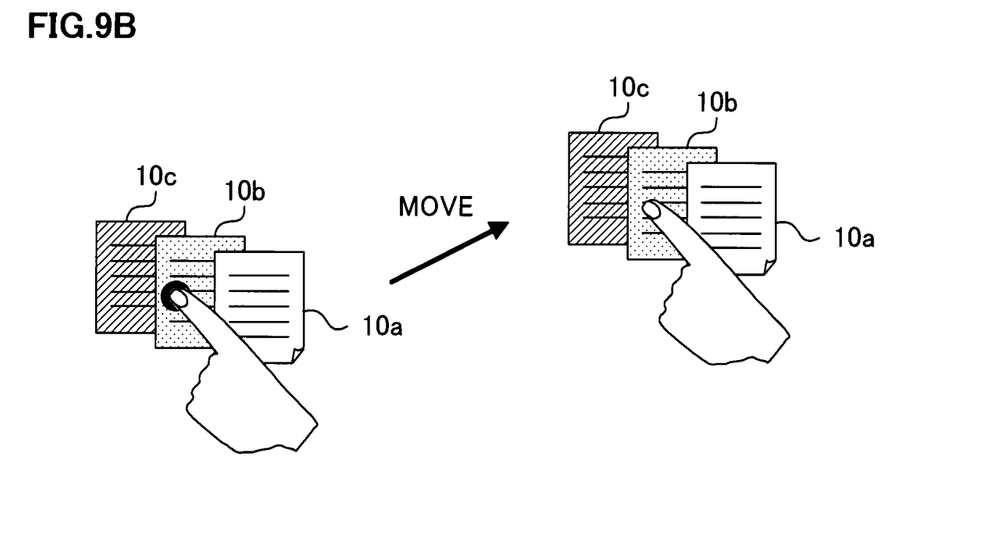

FIGS. 9A and 9B show the case in which the setting condition (3) for selecting all of objects overlapped with the object specified by a touch is set. In this case, all of the objects 10a and 10c that are overlapped with the object 10b are also selected in addition to the object 10b (see FIGS. 9A and 9B for reference).

Third Exemplary Embodiment

In the first and second exemplary embodiments, the case in which one or more objects are selected by touching a position on the display screen 102 is described. In the third exemplary embodiment, the process for selecting one or more objects will be described below in the case in which a user touches plural positions at the same time on the touch panel 103 detecting the plural positions.

Figure 10A:
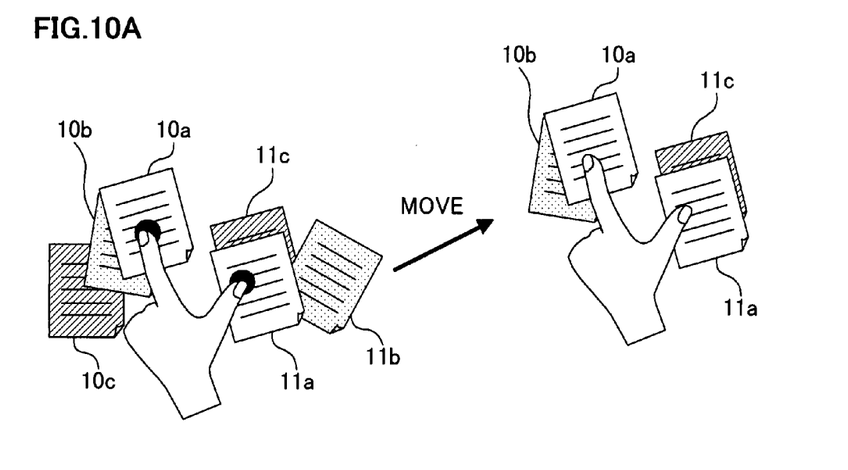
FIGS. 10A and 10B are diagrams illustrating the selection of objects according to the third exemplary embodiment.
Figure 10B:
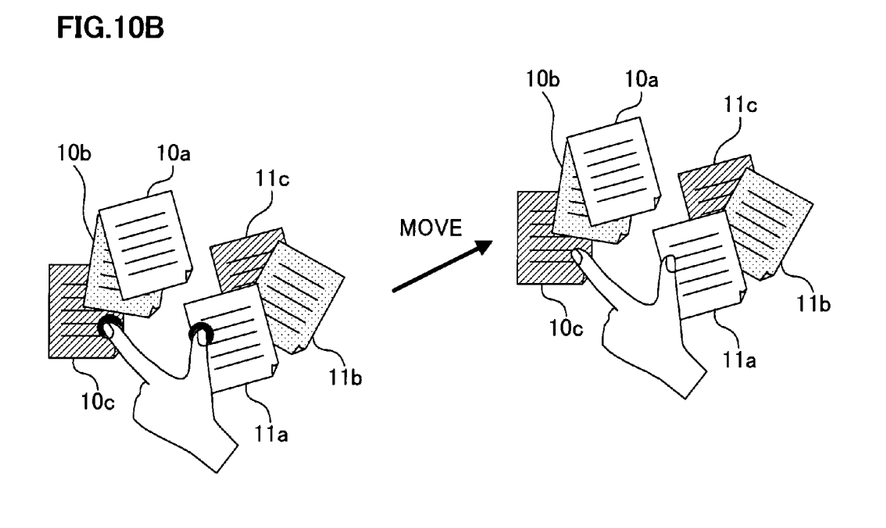

FIGS. 10A and 10B are diagrams illustrating the selection of objects according to the third exemplary embodiment.

A user touches the objects 10a and 11a from plural objects 10a to 10c and 11a to 11c displayed on the display screen 102 at the same time. The object 10b which is overlapped with the object 10a and the object 11c which is overlapped with the object 11a are selected in addition to the touched objects 10a and 11a, as shown in FIG. 10A. Here, the touched objects 10a and 11a of the third exemplary embodiment are examples of the selected object of the present invention, the object 10b is an example of the different object, and the object 11c is an example of the different object of the present invention. In FIG. 10A, the object 10c including a display area overlapped with the object 10a and the object 11b including a display area overlapped with the object 11a are not selected. The objects 10c and 11b are also examples of the different object of the present invention. Therefore, the method for selection is the same as that in the first exemplary embodiment.

In FIG. 10B, when a user touches the objects 10c and 11a at the same time, all of the objects overlapped with the touched objects 10c and 11a are selected. Therefore, the method for selection is the same as that in the second exemplary embodiment.

In the exemplary embodiments, it is also possible to record a program corresponding to the flowcharts shown in FIGS. 4 and 6 in an information recording medium, such as a flexible disk, a hard disc drive or the like, or acquire and record the program corresponding to the flowcharts by a network, such as the Internet or the like, the program is read out and executed by using a general-purpose computer installed in the table type display apparatus 1 and thereby makes the computer function as the table type display apparatus 1 according to the exemplary embodiments.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a display that displays a plurality of objects;
a receiving device that receives selection of a specified one of the plurality of objects by a user's pointing specifying the specified one of the plurality of objects displayed on the display, wherein the selection is performed by the user physically touching the display;
a holding device that holds setting of a process for the specified one of the plurality of objects and for any of the plurality of objects overlapped with the specified one of the plurality of objects;
a judgment device that judges whether or not the display area of the specified one of the plurality of objects of which the selection is received by the receiving device is overlapped with the display area of any of the plurality of objects; and
an execution device that executes the process to select together both the specified one of the plurality of objects of which the selection is received by the receiving device and any of the plurality of objects overlapped with the specified one of the plurality of objects according to the setting held in the holding device, when the judgment device judges that the display area of the specified one of the plurality of objects is overlapped with the display area of any of the plurality of objects, wherein both the selected object and a different object that overlaps the selected object are moveable by the user together as a unit to any position of the display.

2. The image processing apparatus according to claim 1, wherein the holding device holds the setting to select together both the specified one of the plurality of objects and one of the plurality of objects located on a layer under a layer on which the specified one of the plurality of objects is located among any of the plurality of objects overlapped with the specified one of the plurality of objects.

3. The image processing apparatus according to claim 2, wherein,
the image processing apparatus is a table type display apparatus.

4. The image processing apparatus according to claim 1, wherein the holding device holds the setting to select together both the specified one of the plurality of objects and an object located on a layer above a layer on which the specified one of the plurality of objects is located among any of the plurality of objects overlapped with the specified one of the plurality of objects.

5. The image processing apparatus according to claim 4, wherein,
the image processing apparatus is a table type display apparatus.

6. The image processing apparatus according to claim 1, wherein,
the image processing apparatus is a table type display apparatus.

7. An image processing apparatus comprising:
a display that displays a plurality of objects;
a receiving device that receives specified coordinates specified by pointing by a user on a specified one of the plurality of objects;
a holding device that holds setting of a process for any of the plurality of objects overlapped and displayed at the specified coordinates;
a judgment device that judges whether or not the specified coordinates received by the receiving device are included in an overlapped area of any of the plurality of objects; and
an execution device that executes the process to select together any of the plurality of objects overlapped and displayed at the specified coordinates received by the receiving device according to the setting held in the holding device, when the judgment device judges that the coordinates received by the receiving device are included in the overlapped area of any of the plurality of objects, wherein some or all of the plurality of objects that are overlapped each other at a portion including coordinates of the specified position are moveable by the user together as a unit to any position of the display.

8. The image processing apparatus according to claim 7, wherein,
when a plurality of coordinates are specified, the objects having the portion are selected with respect to each of the plurality of coordinates.

9. The image processing apparatus according to claim 8, wherein,
the objects having been selected are moved in accordance with respective movements of the plurality of coordinates made by a user.

10. The image processing apparatus according to claim 7, wherein,
the image processing apparatus is a table type display apparatus.

11. An image processing method comprising:
displaying a plurality of objects;
receiving specified coordinates specified by pointing by a user on a specified one of the plurality of objects;
holding setting of a process for the any of the plurality of objects overlapped and displayed at the specified coordinates;
judging whether or not the specified coordinates received are included in an overlapped area of any of the plurality of objects; and
executing a process to select together all of the plurality of objects which have the overlapped area including the specified coordinates according to the held setting, when the specified coordinates are judged to be included in the overlapped area of the portion of the any of the plurality of objects, wherein some or all of the plurality of objects that are overlapped each other at a portion including coordinates of the specified position are moveable by the user together as a unit to any position of the display.

12. The image processing method according to claim 11, wherein,
when a plurality of coordinates are specified, the objects having the portion are selected with respect to each of the plurality of coordinates.

13. The image processing method according to claim 12, wherein,
the objects having been selected are moved in accordance with respective movements of the plurality of coordinates made by a user.

14. A non-transitory computer readable medium storing computer readable a program for causing a computer to execute a process for image processing, the process comprising:
holding setting of a process for any of a plurality of objects that are overlapped and displayed at specified coordinates specified by a user;
judging whether or not the specified coordinates specified that are specified by pointing by a user are included in an overlapped area of any of the plurality of objects; and
executing the process to select together all of the plurality of objects which have the overlapped area including the specified coordinates, when the specified coordinates are included in the overlapped area of the portion of the any of the plurality of objects, wherein some or all of the plurality of objects that are overlapped each other at a portion including coordinates of a specified position are moveable by the user together as a unit to any position of the display.

15. The non-transitory computer readable medium according to claim 14, wherein,
when a plurality of coordinates are specified, the objects having the portion are selected with respect to each of the plurality of coordinates.

16. The non-transitory computer readable medium according to claim 15, wherein,
the objects having been selected are moved in accordance with respective movements of the plurality of coordinates made by a user.

17. A non-transitory computer readable medium storing a computer readable program for causing a computer to execute a process for image processing, the process comprising:
holding setting of a process for both a specified object specified by a user and a different object of which a display area is overlapped with a display area of the object;
judging whether or not the display area of the specified object that is specified by pointing by a user is overlapped with the display area of the different object, wherein the specified object is specified by the user physically touching a display screen displaying the specified object and the different object; and
executing the process to select together both the specified object and the different object according to the held setting, when the display area of the specified object is judged to be overlapped with the display area of the different object, wherein both the specified object and the different object that overlaps the specified object are moveable by the user together as a unit to any position of the display.

18. The non-transitory computer readable medium according to claim 17, wherein setting in the process of holding the setting is to select together both the specified object and an object located on a layer under a layer on which the specified object is located among the different object.

19. The non-transitory computer readable medium according to claim 17, wherein setting in the process of holding the setting is to select together both the specified object and an object located on a layer above a layer on which the specified object is located among the different object.

20. An image processing method comprising:
displaying a plurality of objects;
receiving specified coordinates by a user's pointing specifying a specified one of the plurality of objects;
holding setting of a process for both the specified one of the plurality of objects and any of the plurality of objects of which a display area is overlapped with a display area of the specified one of the plurality of objects;
judging whether or not the specified coordinates in the display area of the specified one of the plurality of objects of which the selection is received is overlapped with the display area of any of the plurality of objects; and
executing the process to select together both the specified one of the plurality of objects and any of the plurality of objects overlapped with the specified one of the plurality of objects according to the held setting, when the specified coordinates in the display area of the specified one of the plurality of objects are judged to be overlapped with the display area of any of the plurality of objects, wherein both the selected object and a different object that overlaps the selected object are moveable by the user together as a unit to any position of the display.

* * * * *